United States Patent [19]

Andrieu et al.

[11] Patent Number: 4,580,164
[45] Date of Patent: Apr. 1, 1986

[54] METHOD AND DEVICE FOR ARTIFICIAL AFTERGLOW IN A DIGITAL IMAGE CONVERTER

[75] Inventors: Jean-Pierre Andrieu, Paris; Christian Lachaize, Les Ulis; Georg Höller, Viry-Chatillon, all of France

[73] Assignee: Thomson-CSF, Paris, France

[21] Appl. No.: 545,773

[22] Filed: Oct. 26, 1983

[30] Foreign Application Priority Data

Oct. 27, 1982 [FR] France ................................ 82 17984

[51] Int. Cl.$^4$ ............................................. H04N 7/01
[52] U.S. Cl. ................................. 358/140; 343/5 SC; 343/6 TV
[58] Field of Search ........... 358/140; 343/5 SC, 6 TV

[56] References Cited

U.S. PATENT DOCUMENTS 4,240,101 12/1980 Michael ............................... 358/140

Primary Examiner—Howard W. Britton
Attorney, Agent, or Firm—Cushman, Darby & Cushman

[57] ABSTRACT

A method and a device for artificial afterglow in a digital image converter for a radar system wherein there is applied to the image converter a general law of decrease of the after glow constituted by a series of laws, each able to be different, each applied during one antenna revolution. These laws are selected according to the data to be processed, in particular according to their brightness level.

10 Claims, 15 Drawing Figures

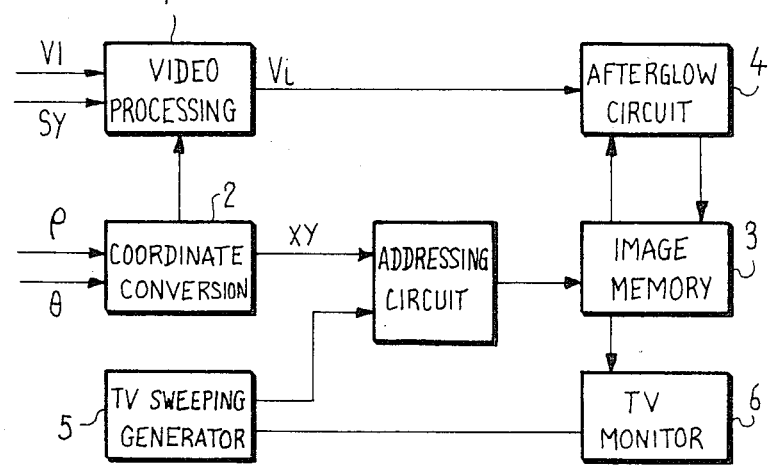
FIG_1
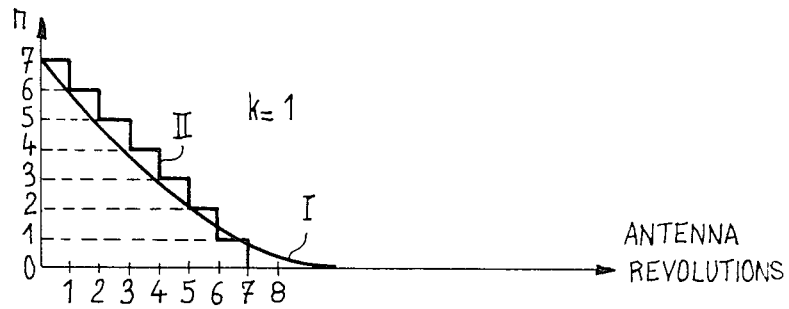
FIG_2
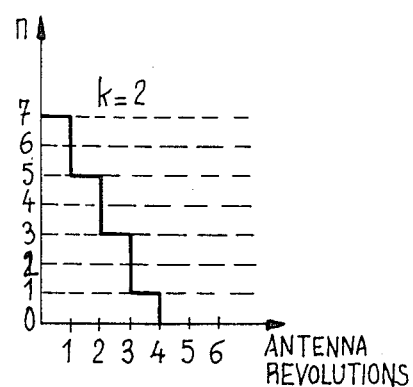
FIG_3
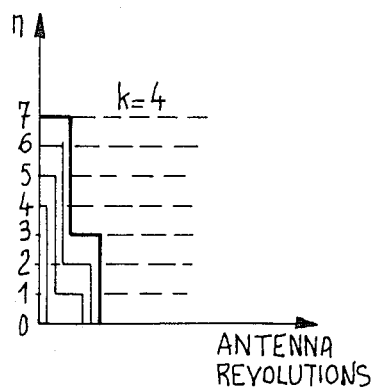
FIG_4

FIG_6    FIG_5
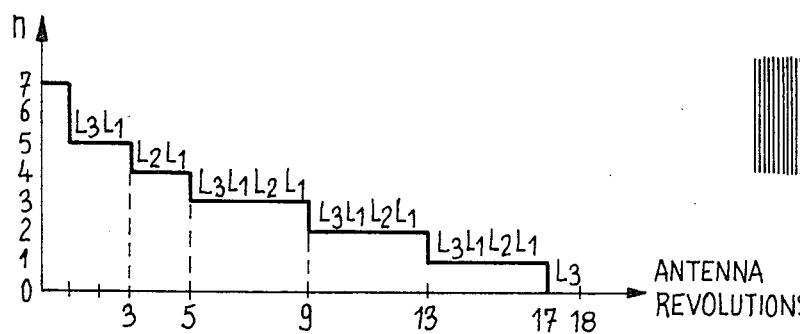
FIG_7
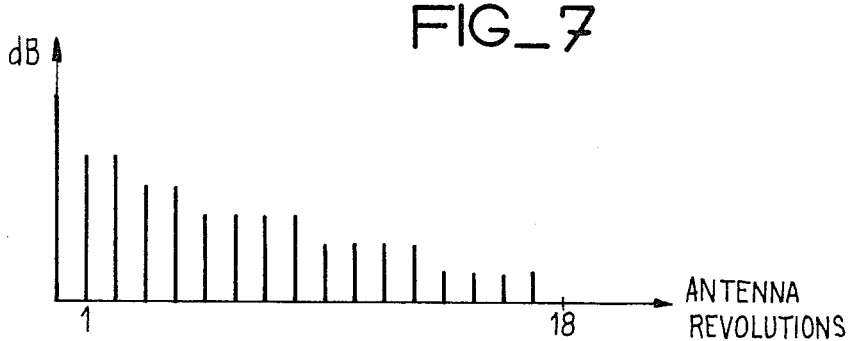
FIG_8
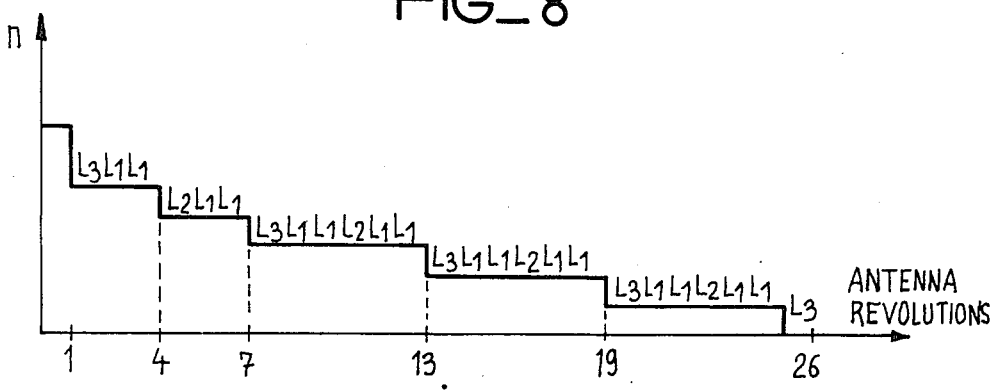
FIG_9

FIG_10
FIG_11
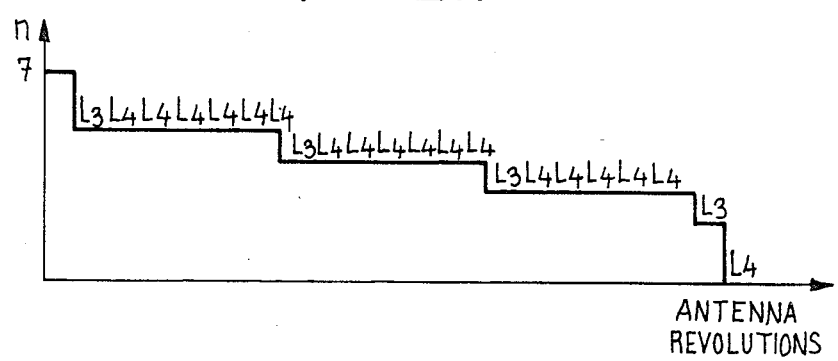
FIG_12
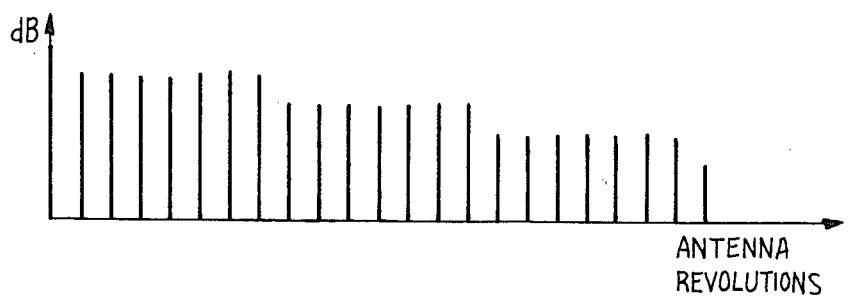
FIG_13
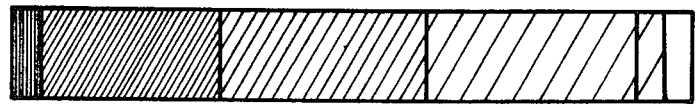

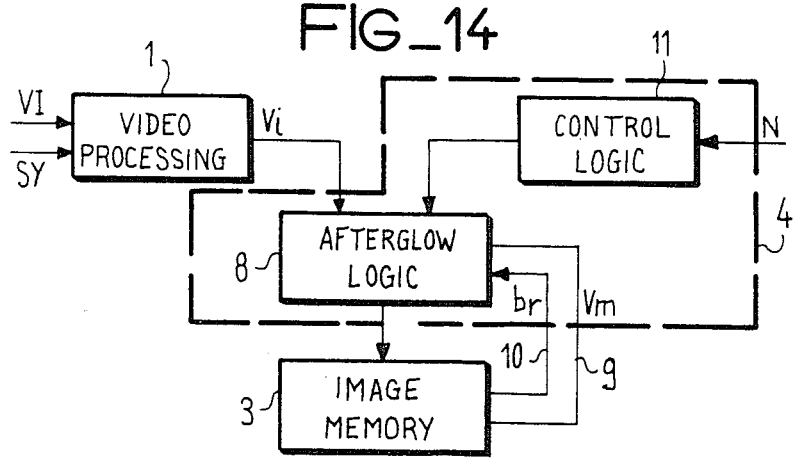
FIG_14
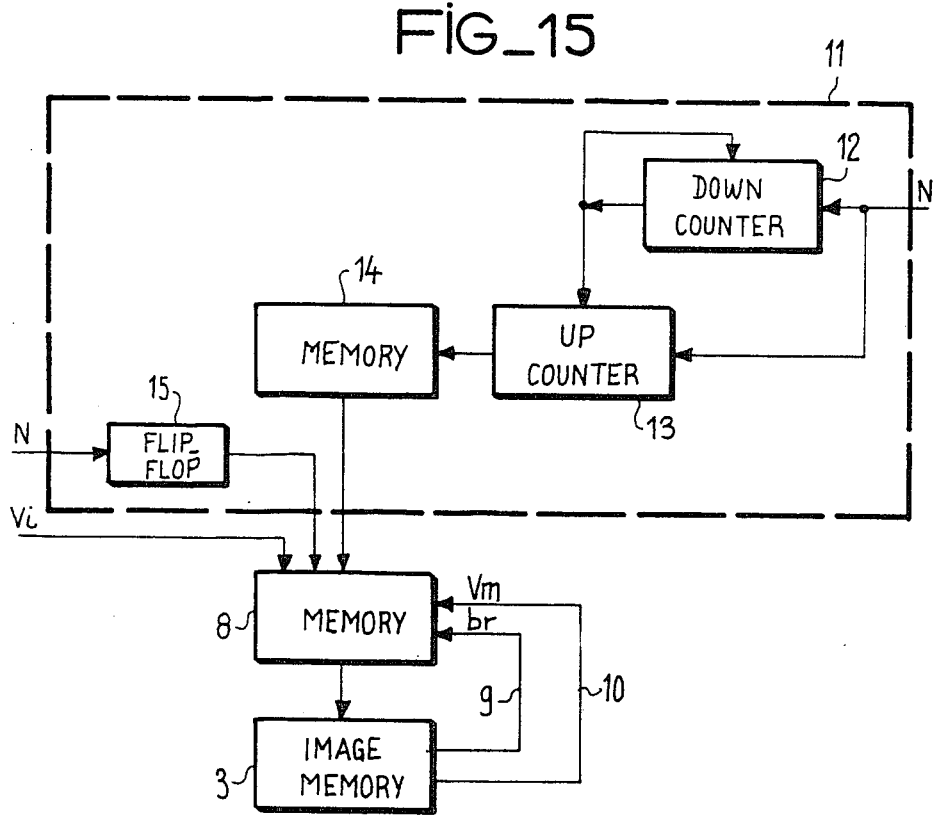
FIG_15

METHOD AND DEVICE FOR ARTIFICIAL AFTERGLOW IN A DIGITAL IMAGE CONVERTER

BACKGROUND OF THE INVENTION

1. Field of the Invention

The present invention concerns processing artificial persistence or afterglow in a digital image converter. It also concerns devices operating this process.

The essential role of an image converter is to convert an image at relatively slow renewal into a television type image, which is very luminous, allowing its exploitation in bright surroundings.

This slow renewal image is generally a radar image but it can also be images issuing fromaa sonar, an infra red sensor, an echography device, that are desired to be visualized on screens functioning as television receiver screens.

According to the prior art, the image converters initially used memory tubes generally comprising two guns, a writing gun controlled in radar sweeping, for example, and a reading gun controlled in television sweeping. Thereafter, digital image converters D.I.C) were introduced, that used digital circuits.

FIG. 1 represents schematically a digital image converter to which the present invention applies.

Such a converter essentially comprises a circuit 1 forming the radar interface in which the incident video is processed, this circuit receiving the radar video signals VI jointly with radar synchronization signals SY, and a circuit 2 for conversion of the polar coordinates, $\theta$ of the radar video in Cartesian representation XY. Circuits 1 and 2 are connected to a digital random access memory 3 (RAM) through an addressing circuit 7. Afterglow circuit 4, the object of the invention, is interposed between interface 1 and memory 3. A TV sweeping generator 5 is connected, through the addressing circuit 7, to memory 3. It is also connected to a television monitor 6, which itself is connected to memory 3.

The functions of the DIC above are the following:

Interface circuit 1 samples and puts into digital form the radar video signals VI that are applied to it. It can include a video compression circuit allowing the acquisition of video signals received by the radar after its emission of a pulse for a defined angle of the antenna or aerial in rotation, corresponding to a synchronization pulse SY, and the reading of these video signals, in delayed time and at a different speed, so as to be adapted to the access time of the image memory 3;

circuit 2 for the conversion of the polar coordinates into Cartesian coordinates allows the calculation of the address of each image element in Cartesian coordinates from radar data received in polar coordinates;

the image memory 3 has a capacity adapted to the television standard used. It can have, for example, 1 024 lines of 1.024 memory points. The luminence of each point or dot can be coded, for example with the use of 3 bits, authorizing eight levels of video intensity for each dot. For this memory, the television reading phase and the radar writing phase are asynchronous. Reading has priority and during a reading phase, conversion is interrupted;

circuit 5 carries out the following operations:
generation of television synczhronization signals,
simultaneous reading of several dots in the image memory 3, in such a way as to respect the access time of the circuits used and to allow writing in this single memory;
analog-digital conversion of this video intensity data read in the image memory in order to generate a television video signal for the television monitor 6 on which the visualized data appears.

Afterglow circuit 4 acts to restore, with respect to digital data, for which the afterglow does not exist, an afterglow effect comparable to that produced on an analog memory tube. The recorded data is not attenuted by itself as a function of time in a digital memory that, without this particular process called artificial afterglow, has a tendency to perform indefinitely, the television image tending towards saturation. On the contrary, on a tube, the brightness of a spot starts to drop once it has been recorded. For a digital memory therefore, the afterglow circuit 4 creates a similar effect, sometimes with a delay of one antenna revolution and a decrease of the level quantified at each revolution.

According to the prior art, the artificial afterglow applied to a D.I.C. follows a law of fixed decrease, i.e. the law of composition between the incident video and the video already recorded in the memory, follows a law which is not variable in time. If the incident video is called Vi, issuing from interface 1, the video existing in the memory 3 is Vm, and the resulting video Vr, i.e. that which will be rewritten in the memory 3, the law that follows the artificial afterglow is the following:

If $Vi \geq Vm$, $Vr = Vi$, i.e. if the incident video has an amplitude superior or equal to the video in the memory, for the memory cell involved, the value of the incident amplitude (Vi) is rewritten into the memory as the value of the resulting video.

If $Vi < Vm$, $Vr = Vm - k$, i.e. if the amplitude of the incident video is inferior to that of the video in memory, $Vm - K$ is chosen as the amplitude of the video signal to be rewritten in memory, the value of the signal already in the memory Vm decreased by a determined constant value k that is called the "decrement factor".

This operation must occur only once for each antenna revolution. In order to check it, each elementary cell of the memory comprises a bit called an afterglow bit which, at each registration operation, is compared to a "revolution bit" that changes value at each revolution. In the case where the incident video signal Vi has an amplitude inferior to the amplitude of signal Vm already put into memory, the retentivity bit is compared with the revolution bit.

If there is inequality between these two bits, signifying that the decrementation of the video was not yet carried out at the antenna revolution involved, for the memory cell analyzed, the new value of the video signal put in memory is $Vr = Vm - k$. The afterglow bit is thus changed, assuming its other logic value, allowing to avoid subsequently at the same antenna revolution a further decrementation for that cell.

If there is egality of the afterglow bit and of the revolution bit, this means that operation $Vm - k$ has already been carried out during the antenna revolution involved for the cell concerned and it will not be repeated.

The decrementation process being carried out simultaneously with the write operations, i.e. in synchronization with the rotation of the antenna for a radar (in a more general framework it would be in synchronization with the arrival of the data from position of a sensor), the effect obtained on the image is very close to that obtained with an analog image converter. On these latter, the signal decreases once it is written, whereas in a digital image converter the decrease begins at the following antenna rotation with a decrementation quantum at each rotation.

FIG. 2 shows the evolution of the brightness level of a given dot, supposed to be initially at the maximum level equal to 7, in relation with the number of antenna revolutions, thus taking into account the evolution of the afterglow in the cases of an analog image (curve 1) and digital (curve II) converter. In the second point, it will be quantified, with $k=1$.

It will also be noted that the term "k" allows fixing of the decrease law of the video in memory. For a video expressed on n bits, the video signal disappearance occurs after $2^n - 1$ antenna rotations if $k=1$.

FIG. 3 is analogous to FIG. 2 and shows that for $k=2$ and a video signal expressed on eight levels, the decrease is obtained on four rotations.

According to the prior art, it is also possible to vary the term k from 1 to $2^n$ for a video expressed on n bits. However, for a given equipment, the term k once selected remains constant.

It can also be noted that for certain values of k, the time necessary for the disappearance of the data does not follow a regular law as a function of the initial level of the incident video.

FIG. 4 is analogous to FIG. 2 and represents a decrease example of a video signal expressed on eight levels with $k=4$.

It will be observed that a video data entered with levels 7, 6 and 5 remains in memory during two antenna rotations, while the data entered with levels 4, 3, 2 or 1 only remains there during one rotation.

Thus, according to what is set out herein-above, it is possible to obtain decrease laws of video data that are close to the natural decrease observed in the analog image converters. However, the decrease law that was selected for a converter remains fixed with time.

It can, however, be selected to be more or less rapid and in this case, it has been observed that for certain relatively high values of k, the decrease of brightness of the data was not regular, the high level of data remaining in the memory longer than the low level data. Furthermore, all the data, whatever their input level, are processed in the same way.

There are, however, certain cases where it would be worthwhile modifying, in a more selective manner, the decrease law of the afterglow in a digital image converter with the purpose of obtaining an improved exploitation of the data displayed on the screen of the television monitor. Thus, in the case where the radar data are relative to afterglow slow moving targets, like ships, it is difficult, when a DIC is used for which the decrease of the afterglow is adjusted according to the prior art, to separate the last echo received from the preceding ones (it is the phenomenon called "fusion"). As a matter of fact, such a target is almost at the same place from one antenna revolution to the next; thus, the echos of that target are displayed substantially on the same area on the TV monitor, producing a large spot. In that case, it is very difficult for the observer to separate the last echo from the spot, and the data concerning the trajectory and the direction of the target are lost. Further, prior art devices are not suitable for marine surroundings due to sea clutter, on which, weak echoes are difficult to select, and also due to some particular fixed targets like a buoy which give rise to a fixed echo but which can be sometimes invisible due to waves.

It is an object of the invention to provide a processing of the afterglow in a digital image converter so that the decrease law that is applied is variable with time and adaptable to the surroundings.

SUMMARY OF THE INVENTION

According to the invention, there is provided a method for artificial afterglow on an image having a renewal period, said image being in the form of an incident video signal ($V_i$), said incident video signal being processed and then stored ($V_m$) in a digital memory, said method comprising a step of comparison of said incident video signal with said stored signal, and a step of rewritting in said memory a signal ($V_r$) resulting from said comparison and from the application of one elementary afterglow law out of a plurality of elementary afterglow laws forming a general afterglow law, said elementary afterglow law controlling the decreasing of the stored signal in relation with said incident signal and with time, each of said elementary afterglow law being applied during one renewal period, said general afterglow law thus being applied during a plurality of renewal periods called a cycle.

BRIEF DESCRIPTION OF THE DRAWINGS

Other advantages and characteristics of the invention will appear from reading through the following description, given with reference to the figures:

FIG. 1: a schematic diagram representing a digital image converter;

FIGS. 2–4: depicts the evolution of the brightness level of a given clot in relation with the number of antenna revolutions;

FIG. 5: a diagram representing on the screen the successive positions of slow moving targets;

FIG. 6: a schematic diagram representing as a function of the antenna revolutions the decrease of the artificial afterglow when, according to the invention, several decrease laws of the artificial afterglow are successively applied;

FIG. 7: a diagram representing the evolution of the amplitude of the echoes of the targets of FIG. 5, after application of a general decrease law of the artificial afterglow, according to the invention;

FIG. 8: a schematic diagram representing as a function of the number of antenna rotations, the decrease of the artificial afterglow, further to the application of several decrease laws of the artificial afterglow of a first sequence;

FIG. 9: a diagram representing the evolution of the amplitude of the echoes as a function of time, during application of the general law represented by FIG. 8;

FIG. 10: a diagram representing, further to the application of the general law of FIG. 8, the notion of trajectory of a target;

FIG. 11: a schematic diagram representing, as a function of the number of antenna revolutions, the decrease of the artificial afterglow, further to the application of several decrease laws of the artificial afterglow in a second sequence;

FIG. 12: a diagram representing the evolution of the amplitude of the echoes as a function of time, during application of the general law represented by FIG. 11;

FIG. 13: a diagram representing, further to the application of the general law of FIG. 11, the notion of a trajectory of a target;

FIG. 14: a schematic diagram of the circuits, determining according to the invention, the decrease law of the artificial afterglow;

FIG. 15: a schematic diagram of the control logic of the artificial afterglow.

In these figures, the same references denote the same elements.

DETAILED DESCRIPTION OF THE INVENTION

As mentioned above, it is an object of the present invention to create, in a digital image converter, a decrease law of the artificial afterglow that is a function of the surroundings, i.e. both the amplitude of the processed video signals and time, for favoring certain echoes with respect to others, and this differently, for example, at each antenna revolution and on a certain number of revolutions. The interconnection of the laws can be any type, according to what is required. However, it must be cyclic.

In FIG. 5 parallel lines represent successive echoes of a given slow moving target.

According to the prior art, as discussed above, these successive echoes have a tendency to form a large luminous and indistinct spot.

In FIG. 5, the scale has not been respected, since in practice the lines represented are not seen.

In a defined operational situation, it is worthwhile separating the last echo registered from the preceding ones. In order to do this, it is necessary to decrement rapidly the high brightness levels of the video data. The level of the last echo having not yet been decremented, it will be detached from the mass.

In order to thereafter obtain on the image the different phases of targets displacement, i.e. to restore the trajectory notion, it is necessary to maintain longer in the memory the video data of the intermediary levels. Furthermore, in order to avoid as many of the drawbacks as possible caused by the noise, i.e. to improve the detection, it is necessary to reduce as much as possible the low levels by applying a rapid decrease law.

The following description gives an example of a combination of decrease laws being a function of the amplitude of the video signals concerned and the time, which provides a solution to the problem that was raised, for example, for slow-moving targets. It is presumed that the video is coded on three bits supplying eight brightness levels. In the following description, four laws are described.

A first law called L1 is such that it brings back high levels, here levels 6 and 7 for example, to level 5 and maintains constant the brightness data that are at levels inferior or equal to 5.

Contrary to what has been explained above for the prior art, where the video signal (Vi) is directly memorized if it presents a brightness superior to that of video Vm already stored in the memory, according to the teaching of the invention, this conditions is arranged in the following manner by what is called a "weighted recording". This weighting is the following:

if $V_i > V_m$ and $V_i \geq$ level 3, $V_r = V_i$ if $V_i > V_m$ and $V_i <$ level 3, $V_r = (V_i + V_m)/2$ This registration allows integration, from one antenna revolution to the next, of the brightness of an average luminous intensity echo, for example, at level 3, the position of which does not vary from one antenna revolution to the next. After a certain number of antenna revolutions, the brightness of this echo has sufficiently increased for it to become visible. In analogous conditions, a noise echo of a comparable brightness level, but which is random, i.e. that is not present in the same position from one antenna revolution to the next, cannot be integrated and furthermore finishes by disappearing. In these conditions, therefore, an average echo becomes visible and a noise echo is suppressed.

The second law called Law L2 is such that it brings back high levels 6 and 7 to level 5, that it decrements level 5 and that it maintains constant the levels lower than level 5. Furthermore, the recording of the incident video Vi is weighted as before.

A third law, Law L3, is such that it brings back high levels to level 5, that it decrements by a single level (K=1) all the levels inferior or equal to level 5. The recording of the incident video is weighted as before.

A fourth law, Law L4, is such that it brings back high levels 6 and 7 and decrements with a factor k=2, the levels inferior or equal to level 3.

Other aims can be defined to be applied according to the operational situation observed and what it is desired to obtain.

According to the present invention, these laws L1, L2, L3, L4 can be successively applied during each renewal period of the incident image, i.e. each revolution of the antenna in the case where a radar is involved, with a determined sequence, allowing accentuation of one effect more than another. It will be noted that the sequence does not exclude the repetition of one or several of these laws. Such a sequence forms a general afterglow law, which is thus variable with time.

FIG. 6 represents the brightness decrease of a dot, which is initially at a maximum brightness (level 7), during the successive antenna revolutions, due to application of a particular combination of the preceding laws, namely $L_3$-$L_1$-$L_2$-$L_1$ forming a general afterglow law.

During the first antenna revolution, the considered dot is at level n=7. During the second revolution, provided that law $L_3$ is applied, the brightness level decreases to level 5. During the following revolution, the law $L_1$ maintains the level 5. During next revolution, the level decreases to level 4 due to law $L_2$, and so on. During the 18th revolution, the dot desapears.

This diagram is shown in the absence of any input video signal ($V_i$) for the considered dot.

FIG. 7 represents a variation during the successive antenna revolutions which is similar to the one of FIG. 6, under the same conditions, where the amplitude of the echoes (dB) replaces brightness levels.

It will be noted that all the laws involved bring the upper levels to level 5. The effect of this is to separate from the luminous spot the last echo received, that becomes perfectly visible with respect to the preceding echoes the brightness level of which is weaker. Law L2 doses the decrease of intermediate level 5 and Law L1 ensures the maintenance of all the video data the intensity of which is inferior or equal to level 5.

FIG. 8 represents, in a way similar to FIG. 6, the general law obtained with a sequence of L3-L1-L1-L2-L1-L1.

A distribution of the average datas levels is observed, for example, 3, 2 and 1, that gives an observer a better notion of the direction and trajectory of a target.

FIG. 9 represents, in a way similar to the one of FIG. 7, the evolution of the amplitude of the echoes when the law of FIG. 8 is applied.

FIG. 10 represents this displacement notion by a fading of the brightness that decreases from left to right. During the first three antenna revolutions, the image is very luminous. It decreases during the following three revolutions, further decreases during the following six revolutions and so on. The brightness decrease is suggested by points that are progressively spaced further apart.

FIG. 11 represents another example of the general law obtained with a sequence L3-L4-L4-L4-L4-L4-L4. In this case, a spreading out of the spot's tail for intermediary levels 5, 4 and 3 and a relatively rapid extinction of the datas of levels 2 and 1 is observed.

FIG. 12 represents the 3 evolution of the amplitude of the echoes when the decrease law of FIG. 11 is applied.

FIG. 13 is a symbolic representation similar to the one of FIG. 10 and where the points are replaced by bands.

From what follows, it is possible to resume the afterglow law resulting from the combination of Laws L1, L2, L3, while making abstraction of time:

For $Vm \geq 5$
   if $Vi \geq 5$, $Vr = Vi$
   if $Vi < 5$, $Vr = 5$
For $3 \leq Vm < 5$
   if $Vi \geq Vm$, $Vr = Vi$
   if $Vi < Vm$, $Vr = Vm$
For $0 \leq Vm < 3$
   if $Vi \geq 3$, $Vr = Vi$
   if $Vi < 3$, $V_r = (V_i + V_m)/2$ FIG. 14 represents a partial diagram of one embodiment of a DIC according to the invention.

The processing circuit 1 of the incoming data VI delivers the incident video Vi to a circuit 8 called afterglow logic that determines the resulting video Vr to be stored in the image memory 3. According to the chosen afterglow law, such as explained herein-above, circuit 8 carries out the comparison between the incident video Vi, delivered by circuit 1, and video Vm actually stored in memory 3 that the latter transmits through connection 9. Through connection 10, memory 3 transmits to circuit 8 the afterglow bit $b_r$ that must prevent a rewriting of a video signal already stored and decremented from being made several times per antenna rotation. A logic circuit called control logic 11, controlled by an angular reference signal e.g. the north signal (N) in the case of a radar, is connected to circuit 8 and controls the changes of the decrementation laws at each antenna rotation, i.e. at each image renewal period, i.e. as a function of time. Circuits 8 and 11 form circuit 4 in FIG. 1.

FIG. 15 represents a schematic diagram of one embodiment of circuit 11 of FIG. 14.

The control logic 11 comprises a down counter 12, controlled by north signal N, an addressing up counter 13, also controlled by signal N, a memory 14 comprising the decrementation laws that can succeed one another according to the invention at each operations cycle. The afterglow logic 8 can be a programmable read-only memory (PROM) or a random access memory (RAM), which contains the general afterglow law and is connected to memory 14. It receives the incident video Vi, the afterglow bit $b_r$ from a flip-flop 15, controlled by the north signal (N), data Vm and bit $b_r$ contained in image memory 3.

The operation of control logic 11 is as follows:

At the beginning of a cycle, i.e. of a plurality of afterglow laws (e.g. four laws in FIG. 6 or six laws in FIG. 8) which will succeed one another and which will be repeated during the following cycles, the down counter 12 contains the number of laws in one cycle. At the end of the down count, a pulse is sent to up counter 13 and to down counter 12, in order to recharge the latter thus allowing it to drive a new cycle.

Counter 13 is started by signal N and the data it delivers is sent to memory 14. That data constitutes an address of an area in memory 14 where is stored the reference (e.g. the number) of the actual law to be applied. The end pulse from counter 12 resets counter 13.

Thus memory 14 furnishes data concerning the law to be applied to circuit 8. The latter furnishes signal Vr upon further reception of signals Vi, Vm, br.

In the herein-above description, some examples of laws that can be aplied in a given operational situation are cited. Other examples of laws can be stored in the equipment, at the disposal of an operator or control function operator, which allows modification of the sequence of laws to be applied according to the operational situation.

It will also be noted that the decrement factor k is variable and, according to the invention, for each law applied, its value can be selected according to the effect desired. There is a possibility of selecting $K = 0$ in a particular operational situation. This can be, for example, the case of an echo whose trace is not to be lost and for which it is required to be stored continuously in the image memory. In this case, selection of $K = 0$ means suppressing the decrease of the afterglow for a certain category of echoes of determined level and, due to this fact, from one antenna revolution to the next, the registered echo does not have its brightness diminished.

The present description concerns a processing of the afterglow in a digital image converter as well as an embodiment given by way of non-limitative example. In practice, the embodiment can be carried out by using a microprocessor.

We claim:

1. A method for artificial afterglow on an image having a renewal period, said image being in the form of an incident video signal ($V_i$), said incident video signal being processed and then stored ($V_m$) in a digital memory, said method comprising the steps of:
   comparison of said incident video signal with said stored signal, and
   rewriting in said memory a signal ($V_r$) resulting from said comparison and from the application of one elementary afterglow law out of a plurality of elementary afterglow laws forming a general afterglow law, said elementary afterglow laws controlling the decreasing of the stored signal in relation with said incident signal and with time, each of said elementary afterglow laws being applied during one renewal period, said general afterglow law thus being applied during a plurality of renewal periods called a cycle.

2. A method according to claim 1, wherein at least one elementary afterglow law is characterized by a decrement factor (k) representing the quantified decreasing of said resultant signal (Vr) in relation with said stored signal ($V_m$), when said incident video signal $V_i$) is lower than said stored signal ($V_m$).

3. A method according to claim 1, wherein at least one elementary afterglow law allows the decreasing of said resultant signal ($V_r$) in relation with said incident video signal ($V_i$) or said stored signal ($V_m$) to be faster when the two latter signals are higher than said resultant signal ($V_r$).

4. A method according to claim 1, wherein at least one elementary afterglow law allows said stored signal of medium amplitude to be substantially maintained.

5. A method according to claim 1, wherein at least one elementary afterglow law allows the decreasing of said resultant signal ($V_r$) in relation with said incident video signal ($V_i$) or said stored signal ($V_m$) to be faster, when the two latter signals are lower than said resultant signal ($V_r$).

6. A method according to claim 1, wherein at least one elementary afterglow law comprises a step of weighting said resultant signal ($V_r$), said step consisting in taking for the value of said resultant signal the arithmetical mean of said incident video signal ($V_i$) and said stored signal ($V_m$), in the case where said incident video signal is greater than said stored signal but lower than a predefined limit.

7. A device for providing artificial afterglow on an image having a renewal period, said image being in the form of an incident video signal ($V_i$), said incident video signal being processed and then stored as a stored signal ($V_m$), said device comprising:
 a video processing circuit, furnishing said incident video signal ($V_i$);
 an image digital memory, wherein is stored said stored signal ($V_m$);
 afterglow logic means, receiving said incident video signal and said stored signal, applying an elementary afterglow law and furnishing said resultant signal ($V_r$) for storing in said image memory;
 control logic means, controlling said afterglow logic means.

8. A device according to claim 7, wherein said image memory further stores an afterglow bit indicating whether the step of rewritting has been done or not during the actual renewal period.

9. A device according to claim 7, wherein said afterglow logic means are digital memory means.

10. A device according to claim 7, wherein said control logic means comprises:
 a down counter, initially storing the number of elementary afterglow laws in one cycle,
 an up counter, and controlled by said down counter,
 a further memory, controlled by said up counter, storing said general afterglow law and controlling said afterglow logic means.

* * * * *